Figure 1:
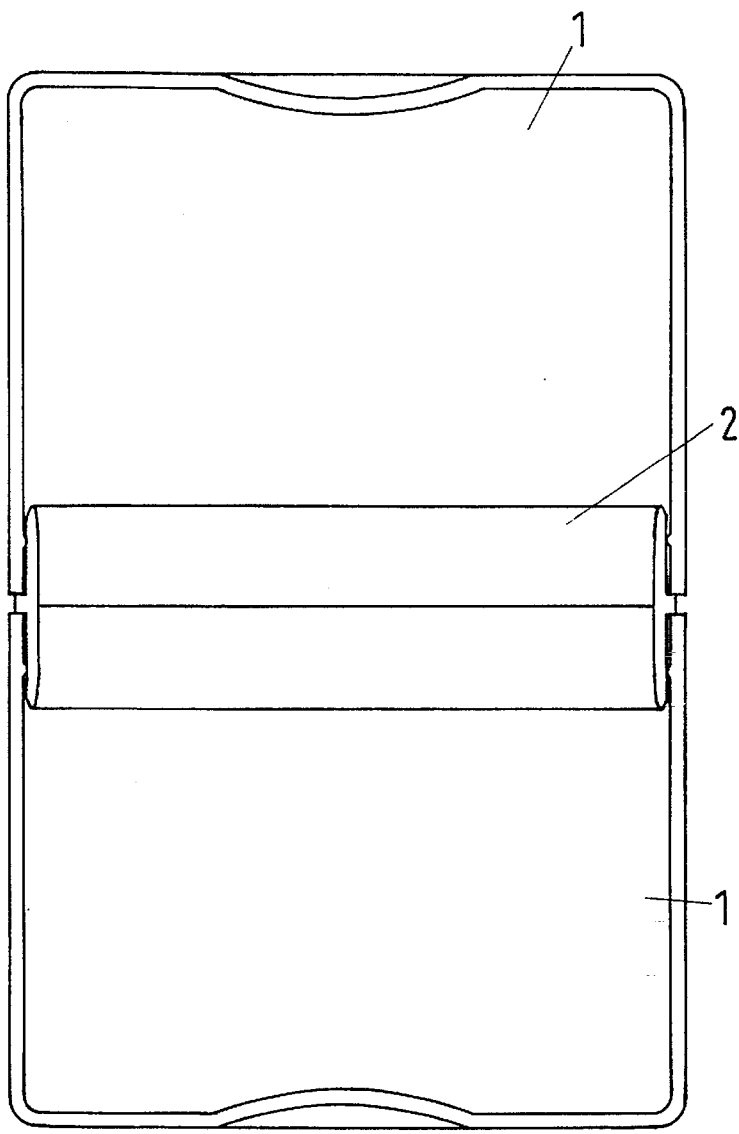

United States Patent [19]

Riedel

[11] Patent Number: 5,636,738

[45] Date of Patent: Jun. 10, 1997

[54] PACKAGE FOR PHOTOGRAPHIC FILMS WITH SNAP ACTION CONNECTIONS

[75] Inventor: Gerd Riedel, München, Germany

[73] Assignee: Agfa-Gevaert, AG, Germany

[21] Appl. No.: 237,789

[22] Filed: May 4, 1994

[30] Foreign Application Priority Data

May 18, 1993 [DE] Germany .......................... 43 16 522.2

[51] Int. Cl.$^6$ .................... B65D 85/67; B65D 8/04
[52] U.S. Cl. .................... 206/403; 206/455; 270/4.21
[58] Field of Search .................... 206/455, 403, 206/389, 407, 410; 211/40; 220/4.21, 4.24, 4.25, 4.06, 4.07, 4.26, 4.27

[56] References Cited

U.S. PATENT DOCUMENTS

| | | | |
|---|---|---|---|
| 663,415 | 12/1900 | Charles | 220/4.21 |
| 2,328,543 | 9/1943 | Bauman | 220/4.24 X |
| 2,364,125 | 12/1944 | Bruening | 220/4.25 |
| 3,169,682 | 2/1965 | Hollingsworth | 211/40 X |
| 3,206,016 | 9/1965 | Fowle et al. | 206/403 |
| 3,447,711 | 6/1969 | Bozek | 220/4.24 |
| 3,540,616 | 11/1970 | Thompson | 220/4.21 X |
| 3,791,514 | 2/1974 | Watanabe | 206/403 X |
| 4,595,037 | 6/1986 | LeBreton et al. | 220/4.21 X |
| 4,756,424 | 7/1988 | Schwartz | 220/4.24 X |
| 4,844,961 | 7/1989 | Akao | 206/455 X |
| 4,854,476 | 8/1989 | Seno, Jr. | 220/2.21 X |
| 4,964,513 | 10/1990 | Ingram et al. | |
| 5,215,192 | 6/1993 | Ram et al. | 206/389 X |

FOREIGN PATENT DOCUMENTS 0225086  4/1943  Switzerland .......................... 220/4.21

*Primary Examiner*—Bryon P. Gehman
*Attorney, Agent, or Firm*—Connolly & Hutz

[57] ABSTRACT

A package for photographic films wound into cartridges, where the package takes the form of a cylindrical tub consisting of two identical tub halves and a support ring over which the openings of the tub halves are pushed, whereby the support ring has a small height in comparison with the tub halves and tub halves and support ring are so designed that they are held together by snap-action connections, can be manufactured more quickly and with less material consumption, is capable of being stacked and also exhibits the advantages of known packages.

6 Claims, 1 Drawing Sheet

PACKAGE FOR PHOTOGRAPHIC FILMS WITH SNAP ACTION CONNECTIONS

The invention relates to a package for films wound into conventional cartridges, in particular of 135 format.

Films of 135 format are contained in approximately cylindrical cartridges having a diameter of about 2.5 cm. The aperture of the cartridge projects beyond the circular cross-section. At this point the cartridge measures roughly 3 cm in diameter. Normally these film cartridges are packaged in cylindrical tubs which consist of two parts, an essentially cylindrical tub with a base, and a matching cap, whereby the tub has an inside diameter slightly larger than 3 cm.

Such tubs are usually manufactured from plastic, which may be dyed black so that the photosensitive film located in the cartridge is shielded against light.

The tub is generally made from a more rigid plastic and the cap generally from a more flexible plastic. This ensures that the cap closes well and that the contents of the tub are protected against the admission of moisture.

This plastic tub containing the film cartridge is in turn packaged in a folding box in the form of a right parallelepiped which exhibits an original seal. Here and in the remainder of the specification the term 'original seal' is understood to mean a seal which is recognisably changed when first opened, by being damaged for example, so that with an unchanged, undamaged seal the customer has a guarantee that the product inside is the original product. Such an original seal does not exclude the possibility that the container can be sealed again.

The disadvantage of such packages is that once the film has been taken out the folding box is discarded as litter, it requires additional expenditure on manufacture, it gives rise to considerable costs as a result of its imprinting with product information, it makes no contribution to product protection, and it increases the product volume.

Hence attempts have been made to manage without such folding boxes. For instance, U.S. Pat. No. 4,964,513 discloses a carton-less recyclable package for the protective packaging of a photographic film, consisting of a plastic container and a matching plastic seal and plastic labels which contain product information, the plastic of said labels being jointly recyclable together with the plastic of the container and of the seal. These labels are very elaborately designed in two layers so as to accommodate the necessary product information on the space which is smaller in comparison with the folding box. A label is also stuck over the seal, said label exhibiting lateral tabs which reach beyond the seal as far as the container and over which the two-layer container label is stuck. This ensures that when the seal is opened the tabs are torn apart, as a result of which it is possible to detect when the container is opened for the first time.

Further disadvantages are, firstly, the fact that the cap has a larger diameter than the tub and consequently sticks out, so that without a folding box the tub cannot easily be stacked on sales shelves, and, secondly, that by virtue of the ratio of its length to its diameter the tub gives rise to long flow paths and mould-release paths and impeded heat discharge in the course of injection moulding, which results in long production times and wall thicknesses which are too large.

The object of the invention is to provide a package which does not require any folding box but which nonetheless exhibits sufficient space for the product information, without any need to resort to complicated solutions such as that described in the aforementioned U.S. Pat. No. 4,964,513, and which avoids the disadvantages stated above.

The object is achieved with a cylindrical tub consisting of three parts: two identical cylindrical tub halves and a support ring, over which the openings of the tub halves are pushed, whereby the support ring has a small height in comparison with the tub halves, and tub halves and support ring are so designed that they are held together by snap-action connections. Over the closed tub a foil is additionally placed which bears the necessary product information, brings about an original seal and constitutes a vapour barrier in addition to the snap-action seal.

By virtue of the fact that the tub halves are lower than the tub known hitherto they can be injection-moulded with a small wall thickness. In addition to savings in material, shorter cycle times also result when the tub halves are produced. The support ring brings about not only the sealing of the tub but also stabilisation of the tub.

The support ring has an inside diameter which is slightly larger than the largest diameter of the cartridge inside, so that the entire tub can have a diameter which is slightly larger than tubs used hitherto.

Covering of the tub with a foil is effected in accordance with known technology; advantageously in such a way that it can easily be torn open by the user.

The tub can be stacked on customary sales shelves.

The tub halves and the support ring can be manufactured from identical material—e.g., polyethylene, polypropylene or polystyrene. This facilitates recycling of the material.

The support ring can be designed in such a way that one snap-action connection is capable of being released more easily than the other one. This ensures that when the tub is opened one tub half remains connected to the support ring. As a result, the danger of the support ring being lost after opening is reduced. The tub can then be re-used—e.g., for holding the exposed film until it is processed.

The Figures show embodiments of the invention.

Figure 2:
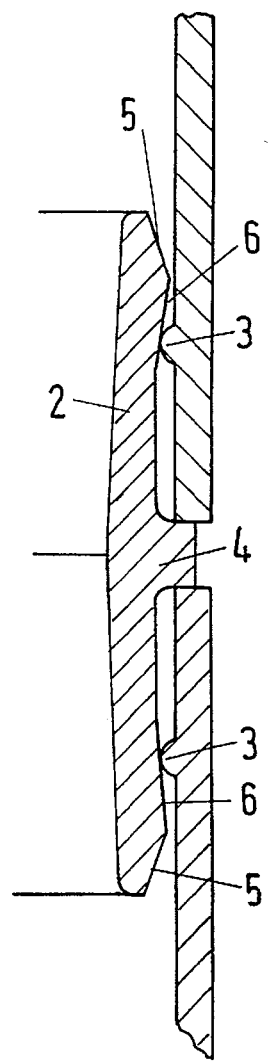

FIG. 1 shows a longitudinal section through a package according to the invention, FIG. 2 shows, on an enlarged scale, the detail of a snap-action seal of tub halves and support ring.

In FIG. 1 the support ring (2) holds together the tub halves (1) by means of a snap-action seal shown in detail in FIG. 2. The tub halves (1) exhibit a peripheral bead (3) slightly below their opening on the inner surface. The support ring (2) exhibits in the middle of the outer surface a bead (4) of approximately rectangular cross-section. Otherwise the diameter of the support ring firstly increases gently, starting from the outer edges, and then decreases again so as to remain constant as far as the bead (4). As a result, the chamfers (5) and (6) are formed above and below the bead (4), said chamfers producing, together with the bead (3) of the tub halves, the snap-action connections.

By means of a different choice of the chamfered faces (5) and (6), the forces for closing and opening the tub can be varied.

I claim:

1. Package for photographic films wound into cartridges, said package is in the form of a cylindrical tub consisting of two identical tub halves each having an opening, and a support ring, the openings of the tub halves are pushed over said support ring, the support ring has a small height in comparison with the said tub halves, said tub halves and said support ring are held together by snap-action connections and one snap-action connection is released more easily than the other snap-action connection whereby when the tub is opened, one tub half remains connected to said support ring.

2. Package according to claim 1, wherein the tub halves and the support ring are manufactured from identical material.

3. Package according to claim 2, wherein a foil is additionally placed over closed tub.

4. Package according to claim 3, wherein the identical material is polyethylene, polypropylene or polystyrene.

5. Package according to claim 4, further comprising a vapor seal in addition to the snap action connections.

6. Package according to claim 1, wherein a foil is additionally placed over the closed tub.

* * * * *